Figure 1:
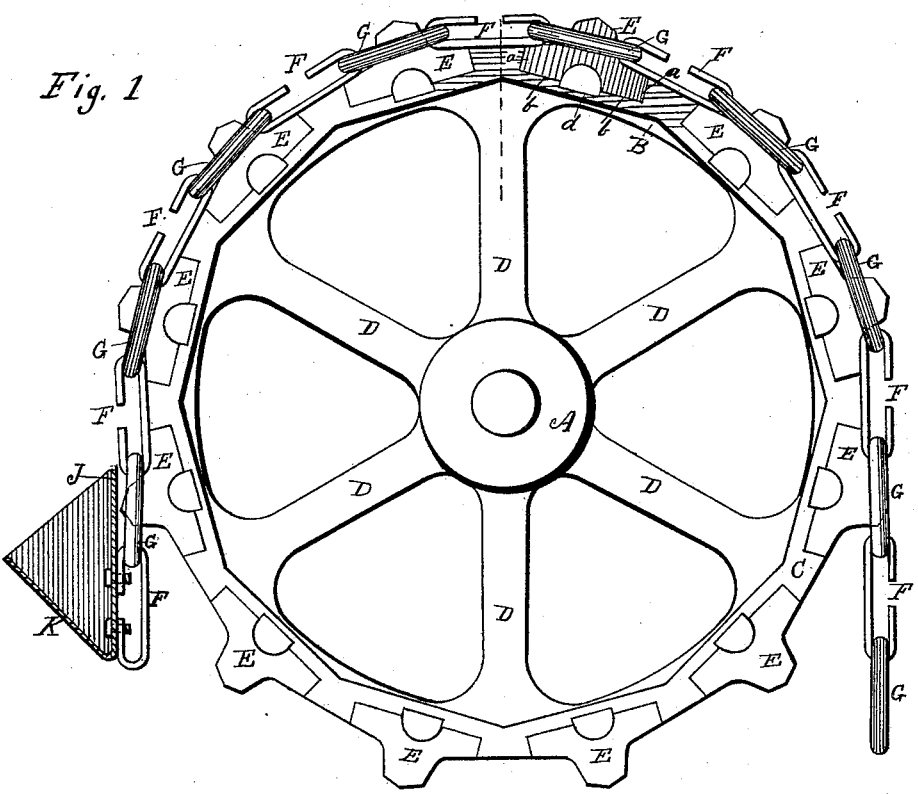

(No Model.) 2 Sheets—Sheet 1.

D. MARCHANT & G. W. PATNOE.
SPROCKET AND CHAIN ELEVATOR.

No. 425,037. Patented Apr. 8, 1890.

Witnesses:
C. M. Long.
Peter R. Fiot

Inventors.
David Marchant
George W. Patnoe
By Attorney
G. L. Chapin

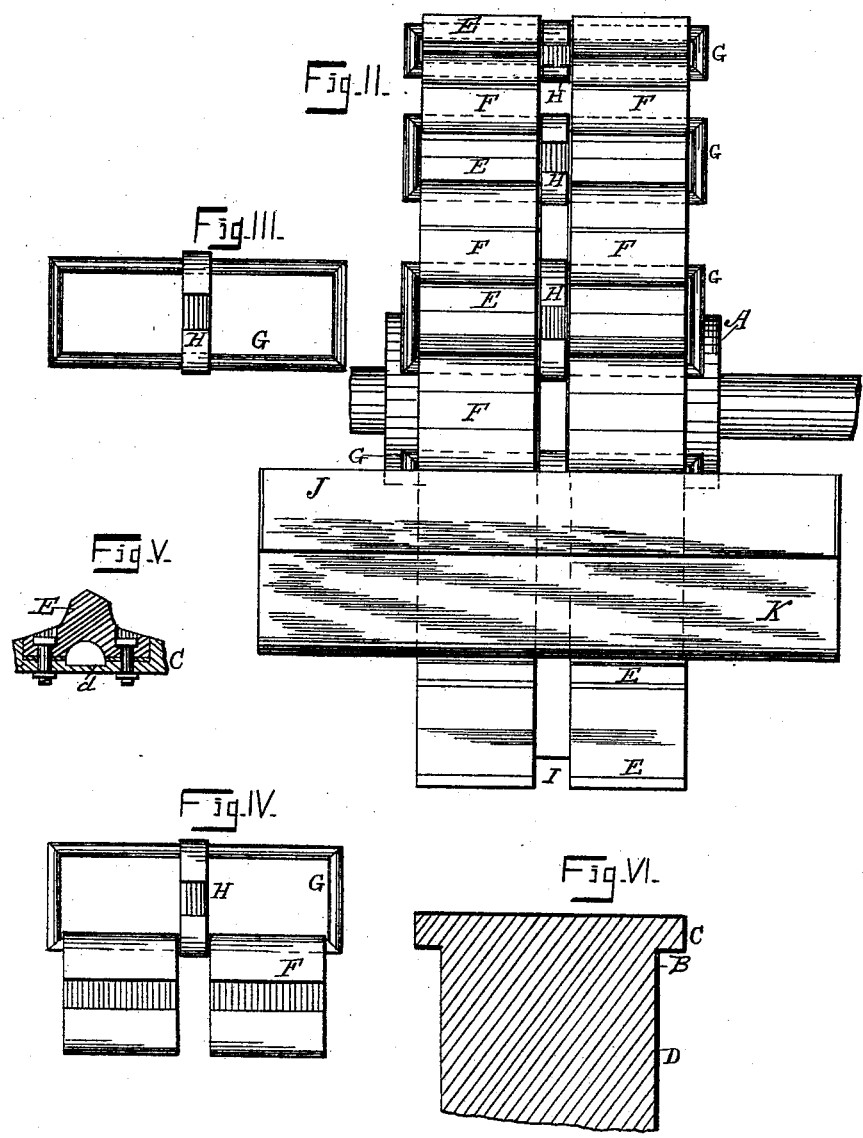

UNITED STATES PATENT OFFICE.

DAVID MARCHANT AND GEORGE W. PATNOE, OF CHICAGO, ILLINOIS, ASSIGNORS TO THEMSELVES AND DOLESE & SHEPARD, OF SAME PLACE.

SPROCKET-AND-CHAIN ELEVATOR.

SPECIFICATION forming part of Letters Patent No. 425,037, dated April 8, 1890.

Application filed August 2, 1889. Serial No. 319,596. (No model.)

*To all whom it may concern:*

Be it known that we, DAVID MARCHANT and GEORGE W. PATNOE, citizens of the United States, and residents of Chicago, in the county of Cook and State of Illinois, have invented new and useful Improvements in Sprocket-and-Chain Elevators, of which the following is a specification, reference being had to the annexed drawings, in which—

Figure I is a broken side elevation of our improved sprocket-and-chain elevator. Fig. II is a face view of Fig. I. Fig. III is a plan of one transverse link and its clutch. Fig. IV is a plan of one transverse link and two connecting-links at one side thereof; Fig. V, a transverse section of one sprocket, showing how it is held to the wheel and how adjusted by a shim. Fig. VI is a short radial section of the sprocket-wheel on line $x$, Fig. I, showing the projecting ends to the periphery of the wheel.

The invention relates to improvements in elevators for hoisting broken stone and like material.

Sprocket-and-chain elevators for hoisting broken stone as constructed prior to our improvements have been substantially inoperative in that the links increase in length by use and the sprockets decrease in width and projection by reason of the expansion of metal and the wear thereon by fine particles of stone, so that soon a link will ride a sprocket and slip with a heavy load in the buckets and the chain is broken. The chain we construct does not differ very much from the endless chain now in use, except the transverse links are clutched midway of their length by cold-shut metal links, which prevents a central spread and insures uniform bearings of the links on the sprockets. The sprockets employed are formed in separate pieces inserted in seats made in the periphery of the wheel for that purpose and secured by bolts put through the projecting ends of the periphery of the wheel. The adjustment is made by loosening the bolts and placing thin pieces of metal between the sprockets and their seats and then tightly turning the nuts on the bolts.

A is the hub, D the arms, B the rim, and C the projecting periphery of the wheel.

The seats for the sprockets are shown at $a\,b\,a\,b$, and they extend across the wheel and are dressed out true, so that the sprockets E may have firm bearings. Centrally between the portions $b\,b$ is a countersink $d$, preferably made in each seat, and there shall be no center for the sprocket to rock on, and above this countersink is formed a recess in the under side of the sprocket E, so that the latter has two bearings in its seat.

The links to which the buckets are bolted are shown at F, and they are what is known as "cold-shut"—that is, their ends do not meet.

The transverse links are shown at G, and the clutch-links thereon are shown at H, the latter running in grooves I, formed in the outer middle portions of the sprockets.

One proportion in construction is, the transverse links G are fourteen inches inside, long measure, and the clutch-links are two inches wide and of flat metal. The transverse measure of links G is six inches from centers, and the links F are six inches wide and six inches long from centers, so that one transverse link and one bucket-link is twelve inches from extreme centers. The buckets may be made considerably longer than the length of the transverse links G and serve a good purpose, inasmuch as there is no lost motion in this form of chain and sprockets when the latter are kept properly "shimmed" up. One of said buckets is shown at J K, the attaching portion J being about twelve inches high and the front about nine and one-half inches wide to correspond with the size of the links given.

We make an elevator which is one-half size larger than the one shown, and this is the maximum size. If more work is to be done, it is preferable that more elevators be employed. Only one sprocket-wheel is shown; but it will be understood that a wheel below of like construction is required to drive the of endless chain and that suitable power is to be applied to one or both of such wheels.

We claim and desire to secure by Letters Patent—

An improvement in sprocket-and-chain elevators, consisting of the wheel A B D, provided with a surrounding portion C, which projects beyond the spokes and rim, and the surrounding portion provided with seats $a\ b$ $a\ b$, in combination with sprockets fitted in the seats and secured by bolts or chain consisting of transverse links clutched centrally with suitable links and bucket-links F, connecting the transverse links and buckets attached to bucket-links, as and for the purpose specified.

DAVID MARCHANT.
GEORGE W. PATNOE.

Witnesses:
E. D. NELSON,
JNO. H. COWPER.